United States Patent
Wang et al.

(10) Patent No.: US 10,813,060 B2
(45) Date of Patent: Oct. 20, 2020

(54) REFERENCE POWER HEADROOM REPORT

(71) Applicant: QUALCOMM Incorporated, San Diego, CA (US)

(72) Inventors: Xiao Feng Wang, San Diego, CA (US); Tao Luo, San Diego, CA (US); Wanshi Chen, San Diego, CA (US); Peter Gaal, San Diego, CA (US); Sony Akkarakaran, Poway, CA (US); Yi Huang, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/250,651

(22) Filed: Jan. 17, 2019

(65) Prior Publication Data
US 2019/0230605 A1 Jul. 25, 2019

Related U.S. Application Data

(60) Provisional application No. 62/619,712, filed on Jan. 19, 2018.

(51) Int. Cl.
*H04W 52/36* (2009.01)
*H04W 72/04* (2009.01)
*H04W 84/04* (2009.01)

(52) U.S. Cl.
CPC ..... *H04W 52/365* (2013.01); *H04W 72/0446* (2013.01); *H04W 84/042* (2013.01)

(58) Field of Classification Search
CPC ..... H04W 52/08; H04W 52/10; H04W 52/12; H04W 52/14; H04W 52/16; H04W 52/36; H04W 52/125; H04W 52/143; H04W 52/146; H04W 52/322; H04W 52/325; H04W 52/327; H04W 52/365; H04W 52/367; H04W 52/386; H04W 72/04; H04W 72/0473; H04W 72/048; H04W 72/0413; H04W 72/0446; H04W 84/042
See application file for complete search history.

(56) References Cited

U.S. PATENT DOCUMENTS

| | | | | |
|---|---|---|---|---|
| 8,565,205 B2* | 10/2013 | Ho | ...... | H04W 52/365 370/252 |
| 9,036,556 B2* | 5/2015 | Park | ...... | H04W 24/10 370/328 |
| 9,603,098 B2* | 3/2017 | Ryoo | ...... | H04W 52/365 |
| 9,807,709 B2* | 10/2017 | Deng | ...... | H04W 92/18 |
| 10,412,690 B2* | 9/2019 | Vajapeyam | ...... | H04W 52/242 |
| 10,531,396 B2* | 1/2020 | Ryoo | ...... | H04W 52/365 |
| 10,575,322 B2* | 2/2020 | Lee | ...... | H04W 72/12 |

(Continued)

FOREIGN PATENT DOCUMENTS

WO 2012059249 A1 5/2012

OTHER PUBLICATIONS

International Search Report and Written Opinion—PCT/US2019/014268—ISA/EPO—dated Apr. 2, 2019.

(Continued)

*Primary Examiner* — Tri H Phan
(74) *Attorney, Agent, or Firm* — Patterson + Sheridan, LLP

(57) ABSTRACT

A method and apparatus are provided for generating and reporting a reference power headroom report (PHR) for New Radio (NR). A user equipment (UE) decides to report a reference power headroom (PH) for at least one carrier frequency in a transmission time interval (TTI). The UE determines at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency. The UE then calculates the reference PH based on one or more of the determined at least one index, and reports, in the TTI, a PHR including the reference PH for the carrier frequency.

30 Claims, 9 Drawing Sheets

(56) References Cited

U.S. PATENT DOCUMENTS

2018/0310257 A1* 10/2018 Papasakellariou .... H04W 52/08
2018/0368075 A1* 12/2018 Chen ................... H04W 72/042

OTHER PUBLICATIONS

Lenovo et al., "PHR for NR CA", 3GPP Draft, R2-1800680, 3rd Generation Partnership Project (3GPP), Mobile Competence Centre, 650, Route Des Lucioles, F-06921 Sophia-Antipolis Cedex, France, vol. RAN WG2, No. Vancouver, Canada, Jan. 22, 2018-Jan. 26, 2018, Jan. 11, 2018 (Jan. 11, 2018), XP051385803, 3 Pages, Retrieved from the Internet:URL:http://www.3gpp.org/ftp/tsg%5Fran/WG2%5FRL2/TSGR2%5FAHs/2018%5F01%5FNR/Docs/ [retrieved on Jan. 11, 20108], p. 1, Paragraph 2; p. 2, Paragraph 3; p. 3, Paragraph 1, figures 1,2.

QUALCOMM Incorporated: "Power Control for NR CA", 3GPP Draft, R1-1800885 Power Control for NR CA, 3rd Generation Partnership Project (3GPP),Mobile Competence Centre, 650, Route Des Lucioles, F-06921 Sophia-Cedex, France, vol. RAN WG1, No. Vancouver, Canada, Jan. 22, 2018-Jan. 26, 2018, Jan. 13, 2018 (Jan. 13, 2018), XP051385153, 2 Pages, Retrieved from the Internet:URL:http://www.3gpp.org/ftp/tsg%5Fran/WG1%5FRL1/TSGR1%5FAH/NR%5FAH%5F1801/Docs/ [retrieved on Jan. 13, 2018], Paragraph [Section 2], Figure 1.

* cited by examiner

REFERENCE POWER HEADROOM REPORT

This application claims priority to U.S. Provisional Application No. 62/619,712, entitled "REFERENCE POWER HEADROOM REPORT FOR NEW RADIO (NR)", filed on Jan. 19, 2018, which is expressly incorporated by reference in its entirety.

FIELD

The present disclosure relates generally to wireless communication systems, and more particularly, to methods and apparatus for generating and reporting reference Power Headroom Reports (PHR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes deciding to report a reference Power Headroom (PH) for at least one carrier frequency in a transmission time interval (TTI), determining at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency, calculating the reference PH based on one or more of the determined at least one index, and reporting, in the TTI, a Power Headroom Report (PHR) including the reference PH for the carrier frequency.

Certain aspects of the present disclosure provide an apparatus for wireless communications by a User Equipment (UE). The apparatus generally includes means for deciding to report a reference Power Headroom (PH) for at least one carrier frequency in a transmission time interval (TTI); means for determining at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency; means for calculating the reference PH based on one or more of the determined at least one index; and means for reporting, in the TTI, a Power Headroom Report (PHR) including the reference PH for the carrier frequency.

Certain aspects of the present disclosure provide an apparatus for wireless communications by a User Equipment (UE). The apparatus generally includes at least one processor and a memory coupled to the at least one processor. The at least one processor is generally configured to decide to report a reference Power Headroom (PH) for at least one carrier frequency in a transmission time interval (TTI); determine at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency; calculate the reference PH based on one or more of the determined at least one index; and report, in the TTI, a Power Headroom Report (PHR) including the reference PH for the carrier frequency.

Certain aspects of the present disclosure provide a computer-readable medium for wireless communications by a User Equipment (UE). The computer-readable medium storing instructions which when processed by at least one processor performs a method generally including deciding to report a reference Power Headroom (PH) for at least one carrier frequency in a transmission time interval (TTI), determining at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency, calculating the reference PH based on one or more of the determined at least one index, and reporting, in the TTI, a Power Headroom Report (PHR) including the reference PH for the carrier frequency.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
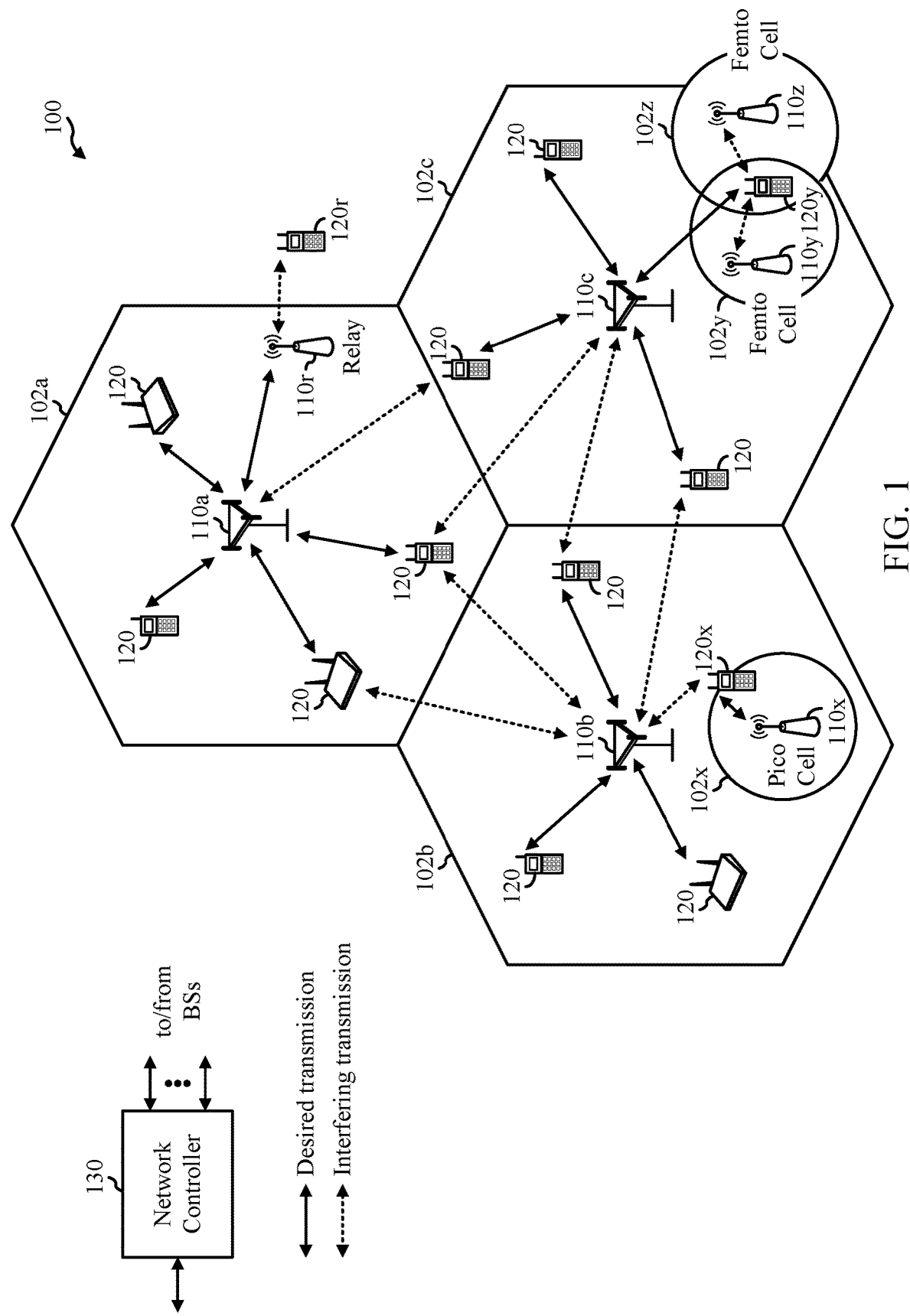
FIG. 1 is a block diagram conceptually illustrating an example telecommunications system, in accordance with certain aspects of the present disclosure.

Power headroom (PH) generally indicates how much transmission power is left for a UE to use in addition to the power being used for a current transmission (e.g., Physical Uplink Shared Channel (PUSCH) transmission). Power headroom may be described as the maximum UE transmission power minus current PUSCH power. A positive value of the power headroom indicates that the UE has more power to spare for UL transmissions. A negative value of the power headroom indicates that the UE is required to transmit at a power higher than what the UE is allowed to transmit.

Power Headroom Report (PHR) is a type of medium access control (MAC) control element (MAC CE) that reports the headroom between the current UE Tx power (estimated power) and the maximum power. The network (e.g., base station) uses this report value to estimate how much uplink bandwidth a UE can use for a specific subframe.

In certain aspects, a reference PHR, which is different from an actual PHR, is reported for cases when the UE does not have the assignment information available at the time of calculating PH. For example, in case of carrier aggregation (CA), there may be multiple carriers/cells configured for the UE, but at the time of calculating PH (e.g., based on a PHR trigger) there may be data scheduled only for a subset of carriers in a particular TTI (e.g., slot). In this case the UE reports reference PHR for the TTI for those carriers which do not have any uplink data scheduled in that TTI. In an aspect, unlike actual PH, reference PH is not based on downlink control information (DCI) decoded by a UE.

Certain aspects of the present disclosure discuss techniques for determining at least one of an index (j) of a target received power of a PUSCH to be transmitted in the TTI and a path loss scaling factor, an index ($q_d$) of a reference signal used for measuring path loss for the carrier frequency, or an index (l) of a power control process used for the carrier frequency, for reference PH calculation, so that the network may best estimate path loss information for a particular carrier frequency based on the reported PH.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, any one or more of the UEs 120 shown in FIG. 1 may perform the techniques for calculating and reporting a power headroom report in accordance with aspects of the present disclosure.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a medical device, a wearable device such as a smart watch, smart clothing, smart glasses, virtual reality goggles, a smart wrist band, smart jewelry (e.g., a smart ring, a smart bracelet, etc.), an entertainment device (e.g., a music device, a gaming device, a video device, a satellite radio, etc.), a vehicular component or sensor, a smart meter/sensor, industrial manufacturing equipment, a positioning device (e.g., GPS, Beidou, GLONASS, Galileo, terrestrial-based), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered Internet of Things devices. The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure. Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. MTC/eMTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
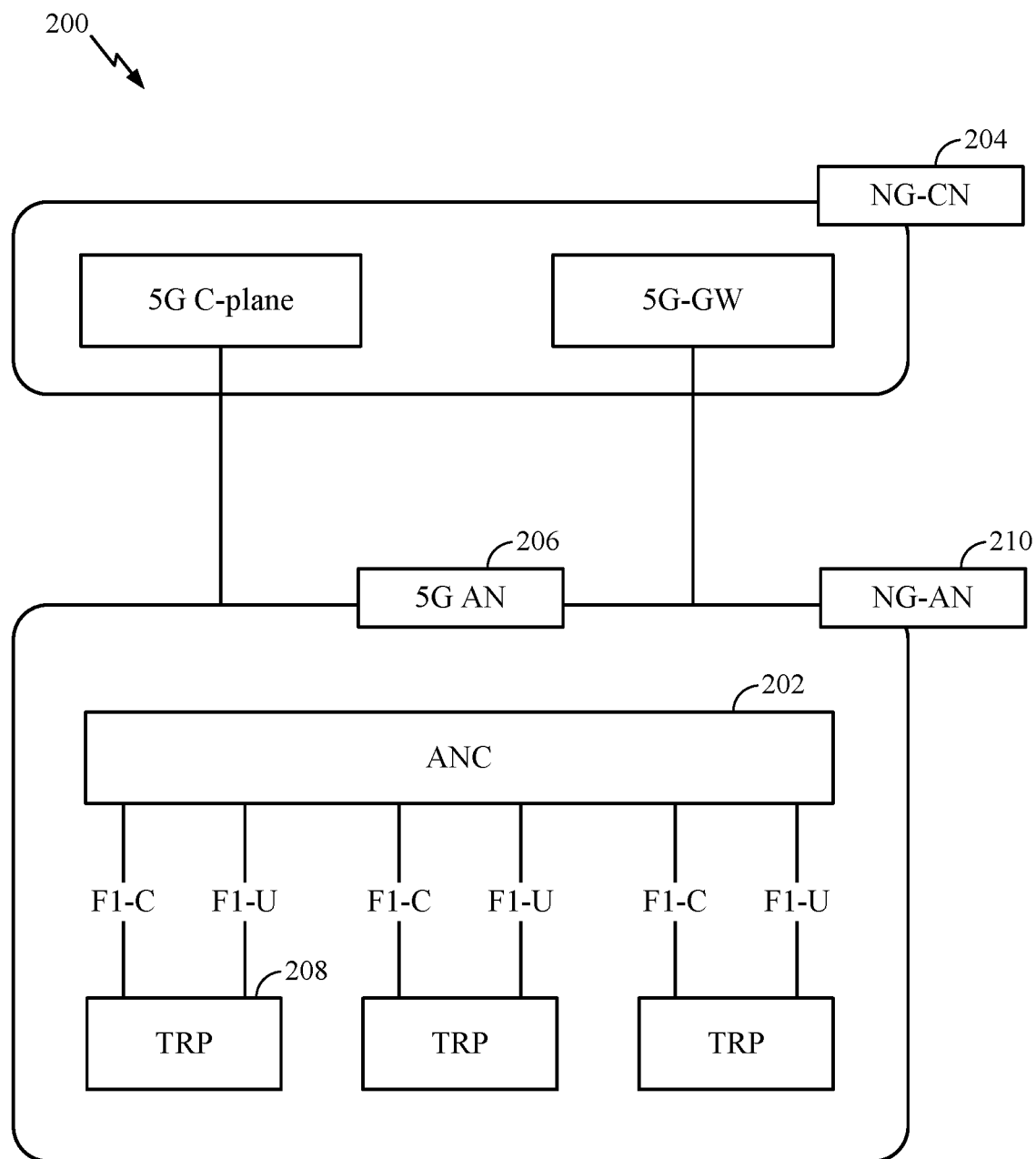
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
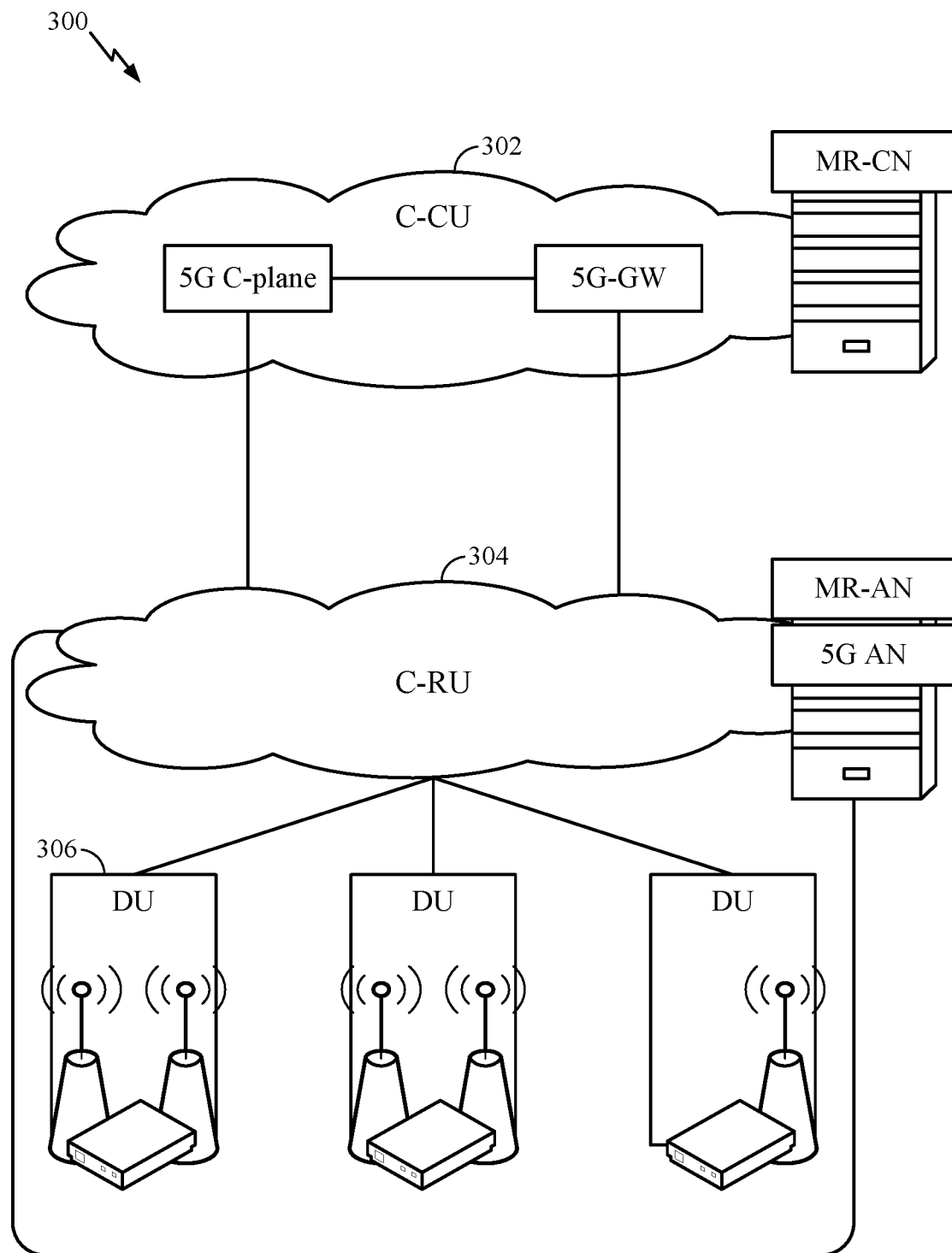
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
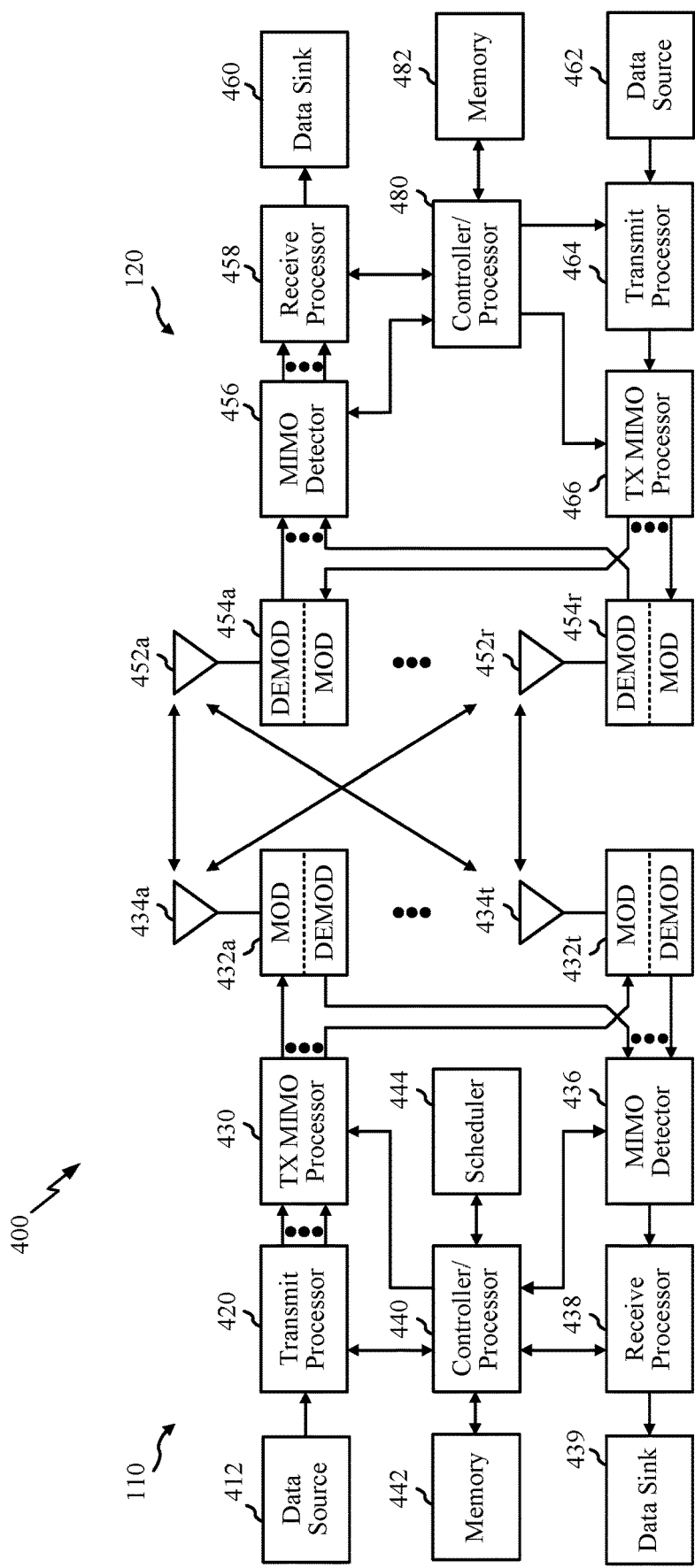
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the processes for the techniques described herein. The processor 480 and/or other processors and modules at the UE 120 may also perform or direct, e.g., execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
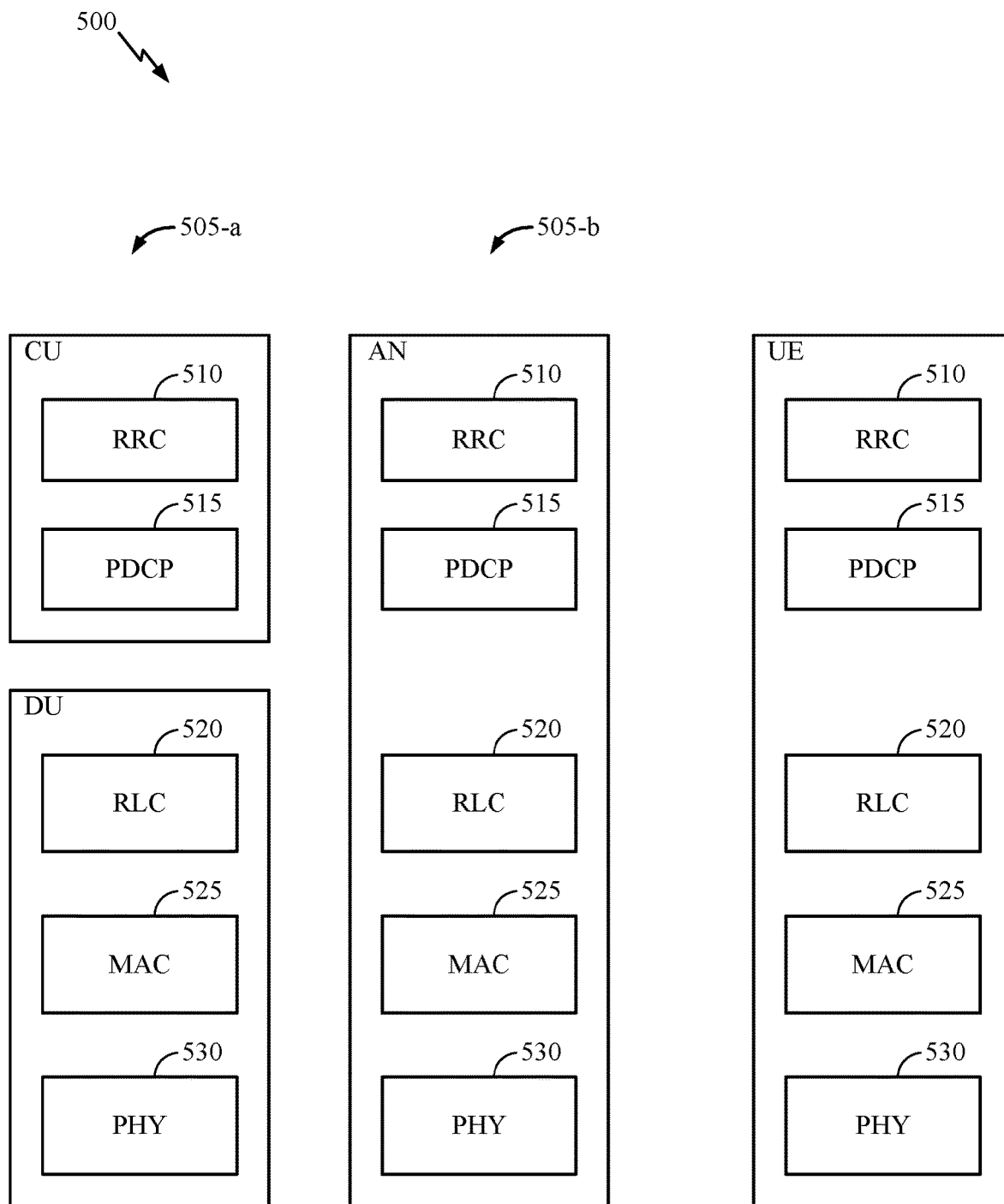
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
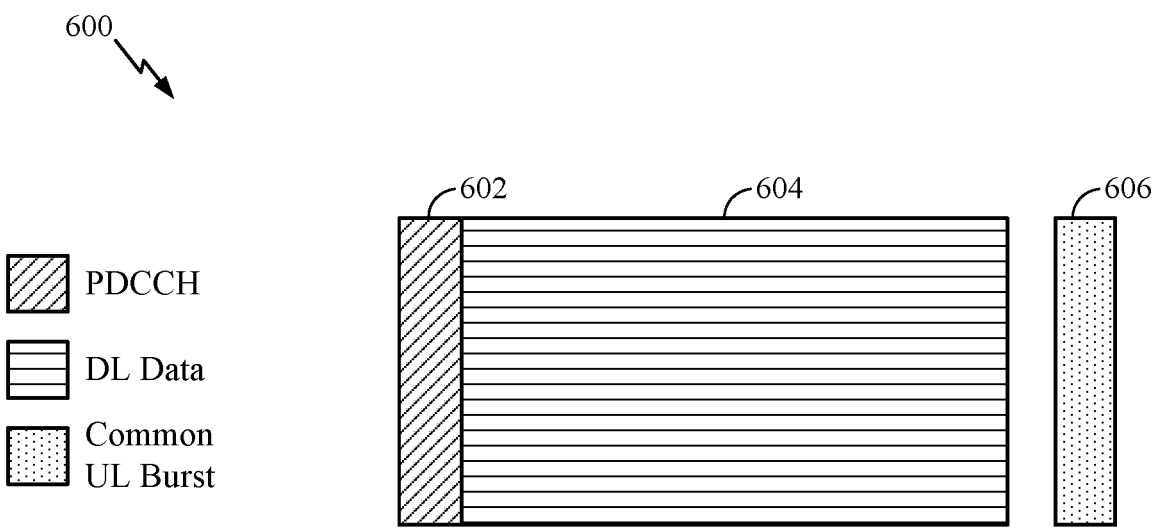
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
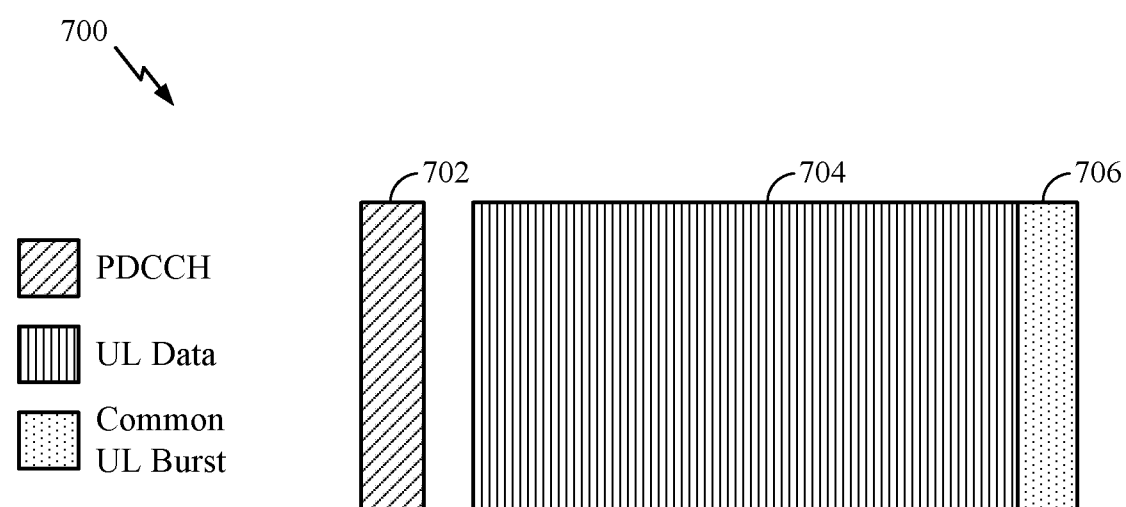
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Reference Power Headroom Reports

In certain cases, (e.g., in NR) the UE may not have enough time to calculate actual PH for certain carriers/cells based on DCI received on respective carriers from a BS. In an aspect, the PHR data including PHRs for multiple carriers is encoded and transmitted over a single carrier. Generally, the PHR for all carriers is included in a MAC header of that carrier. Multiple carriers may be scheduled for UL data transmission in a particular slot, but the UE may not have enough time to calculate PH for that slot with respect to a subset of carriers based on actual DCI information. In an aspect, the PHR data is encoded with data scheduled in the slot, and thus, the PHR needs to be processed well in advance of the transmission, for example, along with the UL data (e.g., PUSCH) to be transmitted in the slot. The UE may not receive DCI for every carrier that has data scheduled in the slot in time for calculating the PHR for transmission in the slot. Thus, the UE transmits a reference PHR in the slot for those carriers for which the UE does not receive DCI in time for processing with other PHRs of other carriers and/or other UL data scheduled in the slot.

Thus, there may be two scenarios in which the UE transmits a reference PHR for a particular carrier frequency. A first scenario is when no UL data is scheduled (no assignment DCI) for a particular carrier frequency in a particular slot. A second scenario is when the assignment DCI for a carrier frequency comes later than a first DCI after a PHR trigger, but before the slot carrying the PHR (but not in time to calculate PHR based on DCI).

In certain aspects, such as in NR, reference PHR is reported for an activated cell (e.g., a carrier frequency of a cell) whose corresponding DCI is received later than the first DCI after PHR trigger, scheduling UL data in the same slot as the first DCI. In an aspect, the PHR trigger is a periodic trigger defined by the network. Additionally or alternatively, PHR is triggered when a path loss of one or more carrier frequencies changes (e.g., falls) beyond defined limits. In an aspect, a UE, in response to a PHR trigger, transmits PHR (e.g., actual or reference PHR), for each configured carrier frequency, in a particular TTI and on one of the carrier frequencies, the TTI scheduled for UL by the first DCI received after the trigger on the carrier frequency.

Figure 8:
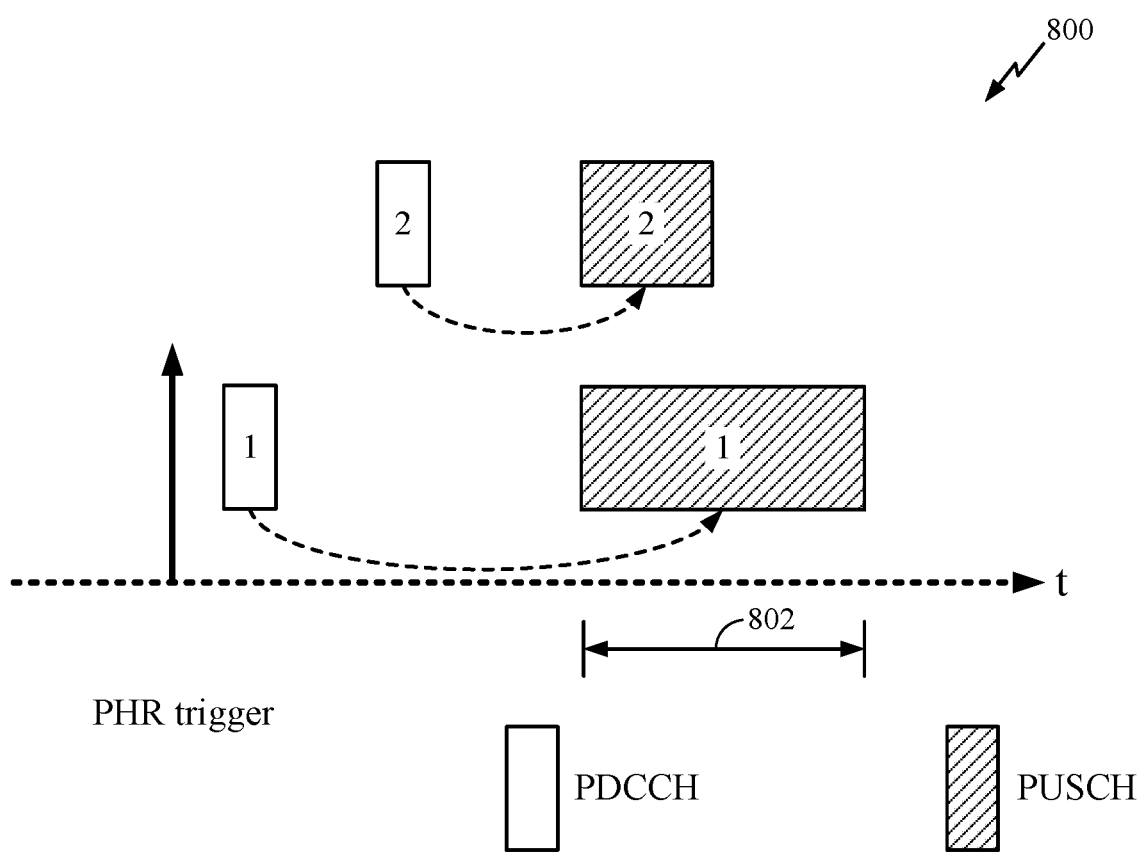
FIG. 8 illustrates timing for transmission of a power headroom report by a UE, in accordance with certain aspects of the present disclosure.

FIG. 8 illustrates timing 800 for transmission of a power headroom report by a UE, in accordance with certain aspects of the present disclosure.

In FIG. 8, the PDCCHs 1 and 2 and corresponding PUSCHs 1 and 2 are associated with different carrier frequencies, for example, carrier frequencies 1 and 2 respectively. PDCCH 1 is the first PDCCH received for carrier 1 after the PHR trigger. PDCCH 1 includes DCI 1 (not shown) that schedules UL data (e.g., PUSCH 1) in a TTI 802 (e.g., slot). PDCCH 2 for carrier 2 is received later in time than PDCCH 1, and includes DCI 2 (not shown) that schedules UL data (PUSCH 2) with a smaller scheduling delay in a portion of the same TTI 802 (same slot as DCI 1) with the same starting time as scheduled by DCI 1. As shown, DCI 2 schedules UL data for a smaller duration, for example, due to larger subcarrier spacing.

In an aspect, the UE based on DCI 1 decides to transmit an actual PHR for carrier 1 in TTI 802. The UE starts forming the PHR right after decoding PDCCH 1. However, the UE does not have DCI 2 for carrier 2 at this time, and thus, decides to transmit a reference PHR for carrier 2 also in the same slot, along with the PHR for carrier 1. Moreover, since the PDCCH 2 carrying DCI 2 is received later in time, the UE may not have sufficient time to form a PHR based on DCI 2 for processing (encoding, multiplexing etc.) along with PHR for carrier 1 and transmission in TTI 802, e.g., as jointly encoded PHR. In an aspect, to be able to jointly process (e.g., encode, multiplex, modulate, etc.) PHRs for both carriers for transmission in TTI 802, the UE needs to have the DCIs for each carrier when it is forming the PHRs. Since the UE has not received and decoded DCI 2 when forming PHR for carrier 1, it calculates a reference PHR for carrier 2 for joint processing with actual PHR for carrier 1.

In an aspect, there may be no UL data scheduled for carrier 2 in TTI 802 coinciding with UL scheduling on carrier 1.

In any case, the UE does not have DCI for carrier 2 when it starts forming the PHR for carrier 1, and thus, calculates a regular PHR for carrier 1 based on DCI 1 and calculates a reference PHR for carrier 2, and transmits (e.g., on carrier 1) the PHR and the reference PHR (e.g., within TTI 802 and jointly encoded as part of PUCCH).

In certain aspects, the UE may be configured with more than two carriers, and the UE may decide to report actual PHR for carrier 1 (based on DCI 1) and reference PHRs for each other carrier (e.g., of active cells) in the same slot on carrier 1 for which the UE does not have the DCI when calculating PHR for carrier 1. In an aspect, if the UE receives and decodes a DCI 3 (not shown) for another carrier 3 before the PHR trigger and the DCI 3 schedules PUSCH 3 in the same TTI 802 (e.g., slot) as scheduled by DCIs 1 and 2, the UE uses the DCI 3 to calculate actual PHR for carrier 3 for transmission (on carrier 1) along with actual PHR for carrier 1 and reference PHR for carrier 2.

Thus, the UE reports actual PHR for carriers/cells for which it has decoded DCI (at the time of calculating PHRs) scheduling UL data in a particular slot, and reports reference PHR for carriers/cells for which the UE receives DCI later or does not receive DCI at all for scheduling UL data in the particular slot.

In certain aspects, such as in NR, the UE may simultaneously maintain two power control (PC) processes/loops for every carrier frequency of each cell. For example, if each cell has one carrier frequency and 10 cells are configured, there may be 20 PC processes configured. In an aspect, the UE must decide PHR corresponding to which PC process must be reported. Additionally, multiple reference signals may be provided to the UE, and the UE is required to maintain channel path loss measurement associated with the multiple reference signals. In an aspect, for one PC process at a given time, only one reference signal is used for measurements. This reference signal is used by the UE to measure the channel and derive the path loss (e.g., for use in power control equations). In an aspect, the UE may switch bins, and the reference signal that is used to measure the path loss may change with each switch.

In certain aspects, NR reference PHR needs to be designed such that it provides maximum amount of useful information to the network. Network may use the reference PHR to derive useful information including path loss information.

In certain aspects, the reference PH for a particular carrier frequency of a cell is calculated with certain pre-defined parameters (e.g., not based on actual DCI) known to the network and the UE, so that the network may obtain information including information regarding a path loss associated with the carrier frequency.

In an aspect, such as in NR, the Type 1 PH for PUSCH transmission occasion (i) for a particular carrier frequency (e.g., UL frequency) (f) of a given cell (c) may be defined as, $$PH_{type1,f,c}(i,j,q_d,l) = P_{CMAX,f,c}(i) - \{P_{o\_PUSCH,f,c}(j) + \alpha_{f,c}(j) \cdot PL_{f,c}(q_d) + \Delta_{TF,f,c}(i) + f_{f,c}(i,l)\}$$

where, $PH_{type1,f,c}$ is the reference PH for carrier frequency (f) of a given cell (c);

$P_{CMAX,f,c}$ is the UE maximum transmission power for frequency f of cell c;

$P_{o\_PUSCH,f,c}$ is the target received power for PUSCH on frequency f for cell c;

$\alpha_{f,c}$ is the scaling factor for path loss $PL_{f,c}$;

$PL_{f,c}$ is the path loss for frequency f of cell c;

$\Delta_{TF,f,c}$ is a parameter related to the coding rate and is selected based on the coding rate used for PUSCH;

$f_{f,c}$ is a power adjustment parameter for closed loop power control and is a cumulative value of the power control command sent in DCI;

i refers to the index of the transmission period and corresponds to the slot in which the PUCCH/PHR transmission takes place (for example, in FIG. 8 i may refer to the slot corresponding to TTI 802);

j is the index of Po which is the target received signal power, and α which is the scaling factor for path loss PL (in an aspect, there may be multiple beams configured on the UL and each beam may have a different target received signal power (e.g., due to different interferences for each beam) governed by j);

$q_d$ is the index of the reference signal (the UE derives the path loss PL based on a reference signal. $q_d$ indicates the index of reference signal used. There may be more than one reference signals configured for the UE. This index indicates which of the configured reference signals is used); and l is the index of the power control process/loop (as noted above, there may be defined up to 2 closed loop PC processes per carrier frequency per cell).

Certain aspects of the present disclosure discuss techniques for determining l, j, and $q_d$ for reference PH calculation, so that the network may best estimate path loss information for a particular carrier frequency based on the reported PH.

Figure 9:
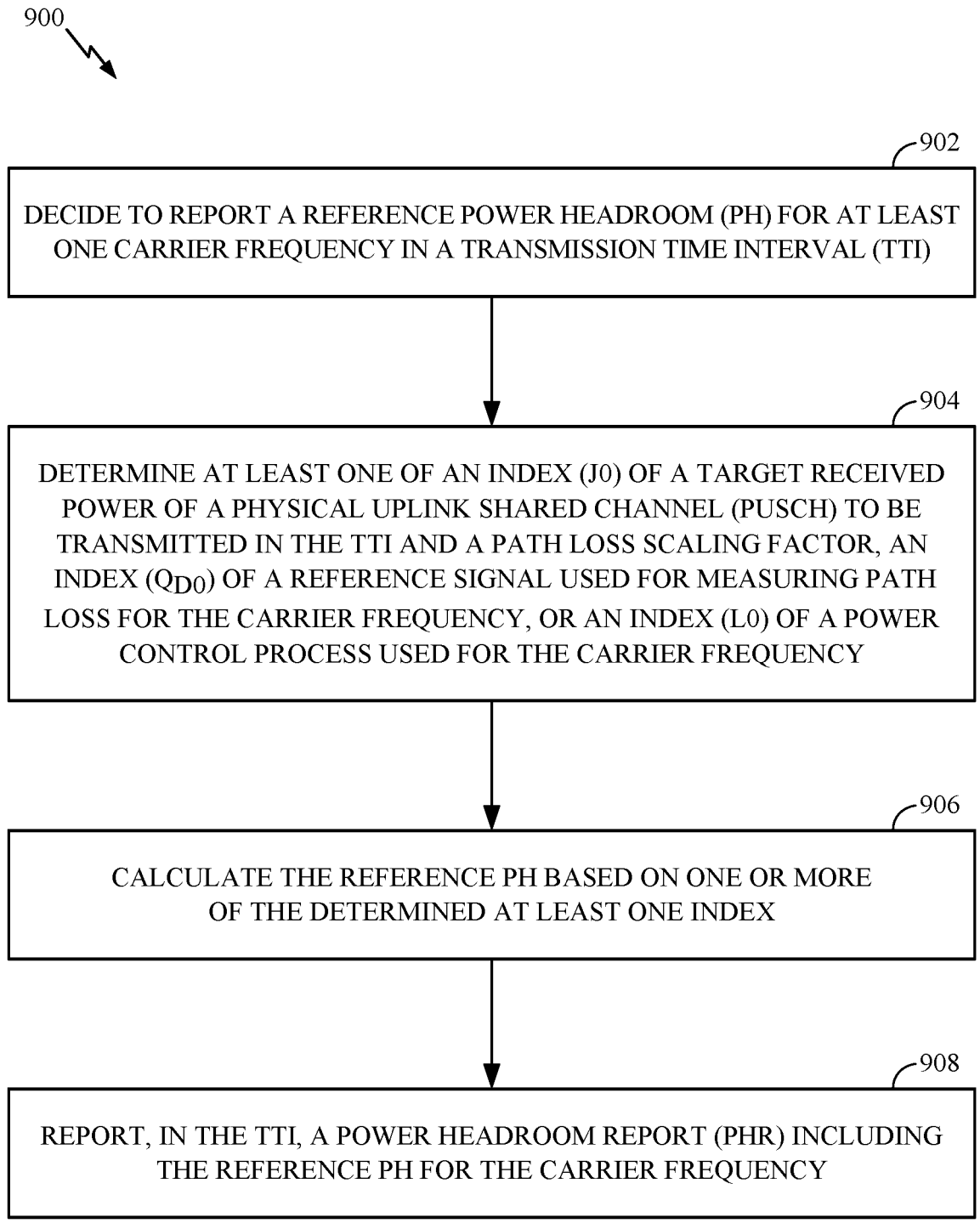
FIG. 9 illustrates example operations for generating and reporting reference PHR by a UE, in accordance with certain aspects of the present disclosure.

FIG. 9 illustrates example operations 900 for generating and reporting reference PHR by a UE, in accordance with certain aspects of the present disclosure.

Operations 900 begin, at 902, by deciding to report a reference Power Headroom (PH) for at least one carrier frequency in a transmission time interval (TTI). At 904, the UE determines at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency. At 906, the UE calculates the reference PH based on one or more of the determined at least one index. At 908, the UE reports, in the TTI, a Power Headroom Report (PHR) including the reference PH for the carrier frequency.

In certain aspects, for a given l, there are typically associated j and $q_d$ at a given time.

In a first technique, an index of the power control process/loop l may be fixed, e.g., l=1 or 2 (e.g., in specification or via RRC configuration), and the $q_d$ and j are the active ones associated with the fixed l. In an aspect, for a given PC process (l), there will be one $q_d$ and j active at a given time. For example, once the UE determines the l for a particular slot I (e.g., based on specification or RRC configuration), it knows the active $q_d$ and j associated with l. In an aspect, the network decides the PC process configuration and sets the value of l, and signals it to the UE. For example, if the network considers a particular power control process (e.g., l=1) more important, the network may set the PC process value (e.g., l=1) for grant based transmission which is the kind of transmission the network expects to receive more consistently. The UE reports the reference PHR based on the fixed PC process.

In a second technique, the UE may use l, $q_d$, and j corresponding to the most recently scheduled PUSCH for the carrier frequency before the PHR trigger. The UE reports reference PHR based on the l value and corresponding $q_d$ and j values corresponding to the most recently scheduled PUSCH before the PHR trigger. A benefit of this technique is that the network will get more information regarding a particular power control process as reports based on this PC process may be more frequent. One downside may be that if the UE fails to decode a particular DCI, it may transmit a reference PHR based on an older DCI for a different PC process.

In a third technique, the network defines a slot pattern and configures a particular l for the slot pattern. The UE, for reporting reference PHR in a slot which is part of the slot pattern, uses the l value configured for the pattern. For example, the network may define and/or configure (e.g., via RRC configuration) a slot set A (e.g., all odd numbered slots). In an aspect, for calculating PHR at slots belonging to set A (e.g., i=index of a slot belonging to set A), l=1, and $q_d$ and j are the active ones associated with l=1; For the rest of the slots (e.g., even number slots), l=2 and $q_d$ and j are the active ones associated with l=2.

In a fourth technique, an index of the power control process/loop l may be fixed, e.g., l=1 or 2 (e.g., in specification or via RRC configuration), and j is the configured one associated with l. $q_d$ (and associated j, if different j is configured for different $q_d$), is a function of slot index.

In an aspect, one of the control processes/loops may be more important from the network point of view. For example, l=1 may be configured for grant based UL transmission. However, the network may want to know the path loss information associated with different bins. Although there may be only one bin associated with a power control loop, there may be multiple antenna beams configured for the UE in the power control configuration with one reference used per beam. In this case, j is a function of l, and $q_d$ is a function of the slot index (i). For example, for four beams, the network may define four different slot sets, and a different reference signal may be used for each slot set. By doing this the network may get information regarding path loss for different beams.

In an aspect if the value of α and Po are fixed, there is no need for j index. That is, if values of α and $P_o$ are fixed, j is also a fixed value. For example, in each of the above described techniques, the PHR may be defined by fixing α to a known value (e.g., 1) and setting $P_{o\_PUSCH}$=Po-nominal-pusch-withgrant, a cell specific value, or any other predefined reasonable value. In an aspect, this removes the dependency of j.

In certain aspects, one or more of the above described techniques may be defined by the network, and the network may configure the UE (e.g., via RRC signaling) which technique to apply.

Figure 10:
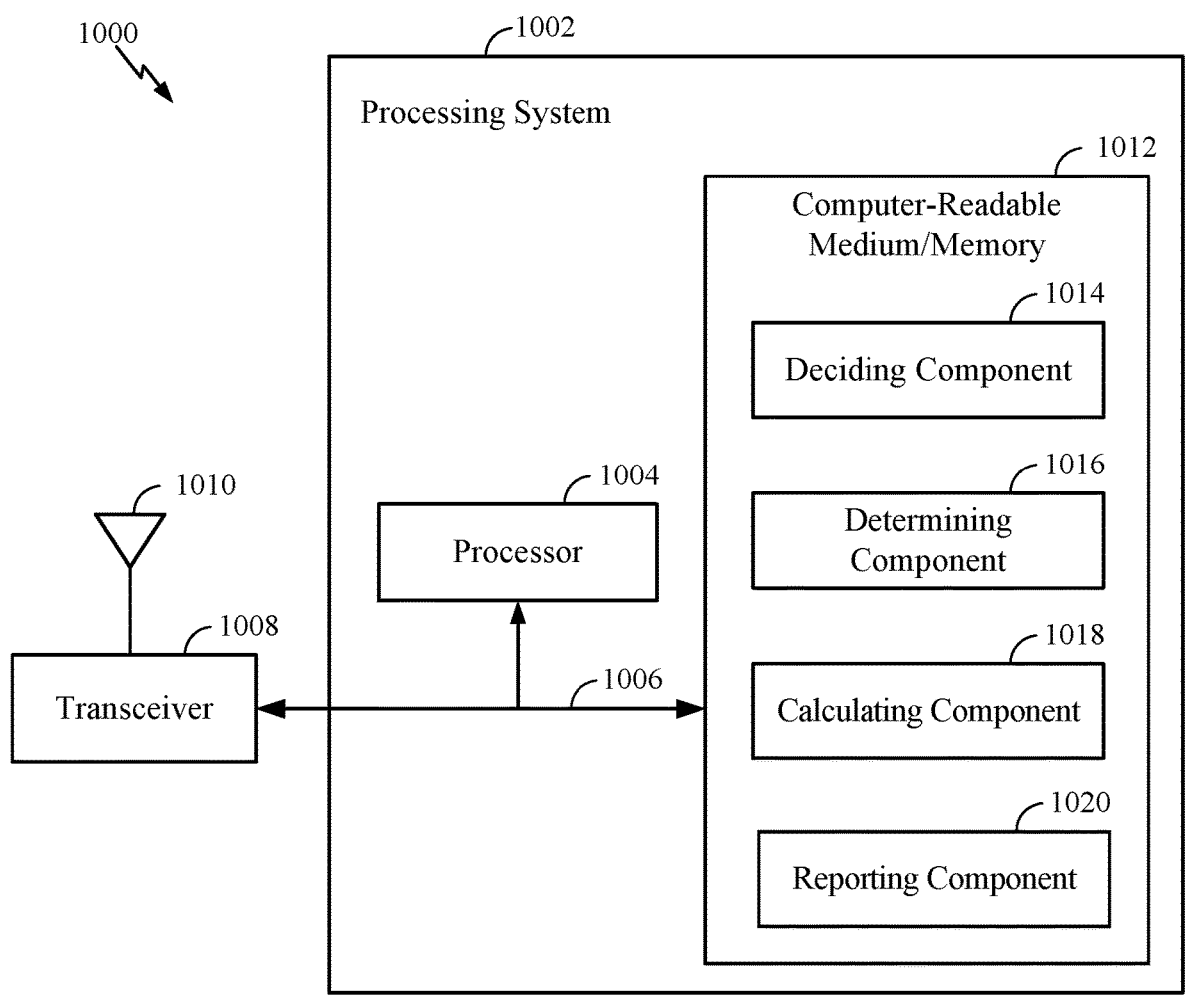
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIG. 9, or other operations for performing the various techniques discussed herein.

In certain aspects, the processing system 1002 further includes a deciding component 1014 for performing the deciding operation illustrated in FIG. 9. Additionally, the processing system 1002 includes a determining component 1016 for performing the determining operation illustrated in FIG. 9. Additionally, the processing system 1002 includes a calculating component 1018 for performing the calculating operation illustrated in FIG. 9. Additionally, the processing system 1002 includes a reporting component 1020 for performing the reporting operation illustrated in FIG. 9. The deciding component 1014, determining component 1016, and calculating component 1018 and reporting component 1020 may be coupled to the processor 1004 via bus 1006. In certain aspects, the deciding component 1014, determining component 1016, and calculating component 1018 and reporting component 1020 may be hardware circuits. In certain aspects, the deciding component 1014, determining component 1016, and calculating component 1018 and reporting component 1020 may be software components that are executed and run on processor 1004.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for obtaining, means for designating, means for aggregating, means for collecting, means for selecting, means for switching, and means for detecting may comprise one or more processors, such as the controller/processor 480, transmit processor 464, receive processor 458, and/or MIMO processor 466 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
    deciding to report a reference Power Headroom (PH) for at least one carrier frequency in a transmission time interval (TTI);
    determining at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency;
    calculating the reference PH based on one or more of the determined at least one index; and
    reporting, in the TTI, a Power Headroom Report (PHR) including the reference PH for the carrier frequency.

2. The method of claim 1, wherein the determining comprises:
    selecting the index l configured for the UE; and
    selecting an active index j and an active index $q_d$ both associated with the selected index l.

3. The method of claim 2, further comprising receiving an indication of the index l configured for the UE.

4. The method of claim 1, wherein the determining comprises:
    selecting the indices l, j and, $q_d$ of the most recently scheduled PUSCH for the carrier frequency before detecting a trigger for reporting the PHR.

5. The method of claim 1, wherein the determining comprises:
    determining if an index of the TTI is part of a set of indices associated with a TTI pattern, wherein the UE is configured with at least one TTI pattern; and
    selecting the index l configured for the determined TTI pattern; and
    selecting an active index j and an active index $q_d$ both associated with the selected 1.

6. The method of claim 5, wherein the UE is configured with at least two TTI patterns, wherein each of the at least two TTI patterns has a different configured value of the index l.

7. The method of claim 1, wherein the determining comprises:
    selecting the index l configured for the UE; and
    selecting the index j associated with the selected index l; and
    selecting the index $q_d$ as a function of an index of the TTI.

8. The method of claim 7, wherein the UE is configured with a plurality of sets of TTI indices, wherein each set is configured with a different value of the index $q_d$.

9. The method of claim 8, wherein selecting the index $q_d$ comprises:
   determining that the index of the TTI is part of one of the sets of TTI indices; and
   selecting the value of the index $q_d$ configured for the determined set of TTI indices.

10. The method of claim 1, further comprising receiving an indication of a technique to use for determining at least one of the index l, the index j, or the index $q_d$.

11. The method of claim 1, wherein the determining comprises determining a fixed value of index j based on fixed values of a scaling factor ($\alpha$) for path loss (PL) and a target received power ($P_o$).

12. An apparatus for wireless communication by a User Equipment (UE), comprising:
   means for deciding to report a reference Power Headroom (PH) for at least one carrier frequency in a transmission time interval (TTI);
   means for determining at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency;
   means for calculating the reference PH based on one or more of the determined at least one index; and
   means for reporting, in the TTI, a Power Headroom Report (PHR) including the reference PH for the carrier frequency.

13. The apparatus of claim 12, wherein the means for determining is configured to:
   select the index l configured for the UE; and
   select an active index j and an active index $q_d$ both associated with the selected index l.

14. The apparatus of claim 12, wherein the means for determining is configured to:
   select the indices l, j and, $q_d$ of the most recently scheduled PUSCH for the carrier frequency before detecting a trigger for reporting the PHR.

15. The apparatus of claim 12, wherein the means for determining is configured to:
   determine if an index of the TTI is part of a set of indices associated with a TTI pattern, wherein the UE is configured with at least one TTI pattern; and
   select the index l configured for the determined TTI pattern; and
   select an active index j and an active index $q_d$ both associated with the selected 1.

16. The apparatus of claim 12, wherein the means for determining is configured to:
   select the index l configured for the UE; and
   select the index j associated with the selected index l; and
   select the index $q_d$ as a function of an index of the TTI.

17. The apparatus of claim 12, further comprising means for receiving an indication of a technique to use for determining at least one of the index l, the index j, or the index $q_d$.

18. The apparatus of claim 12, wherein the means for determining is configured to determine a fixed value of index j based on fixed values of a scaling factor ($\alpha$) for path loss (PL) and a target received power ($P_o$).

19. An apparatus for wireless communication by a User Equipment (UE), comprising:
   at least one processor configured to:
      decide to report a reference Power Headroom (PH) for at least one carrier frequency in a transmission time interval (TTI);
      determine at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency;
      calculate the reference PH based on one or more of the determined at least one index; and
      report, in the TTI, a Power Headroom Report (PHR) including the reference PH for the carrier frequency; and
   a memory coupled to the at least one processor.

20. The apparatus of claim 19, wherein the at least one processor is configured to determine the at least one of the indices by being configured to:
   select the index l configured for the UE; and
   select an active index j and an active index $q_d$ both associated with the selected 1.

21. The apparatus of claim 19, wherein the at least one processor is configured to determine the at least one of the indices by being configured to:
   select the indices l, j and, $q_d$ of the most recently scheduled PUSCH for the carrier frequency before detecting a trigger for reporting the PHR.

22. The apparatus of claim 19, wherein the at least one processor is configured to determine the at least one of the indices by being configured to:
   determine if an index of the TTI is part of a set of indices associated with a TTI pattern, wherein the UE is configured with at least one TTI pattern; and
   select the index l configured for the determined TTI pattern; and
   select an active index j and an active index $q_d$ both associated with the selected index l.

23. The apparatus of claim 19, wherein the at least one processor is configured to determine the at least one of the indices by being configured to:
   select the index l configured for the UE; and
   select the index j associated with the selected index l; and
   select the index $q_d$ as a function of an index of the TTI.

24. The apparatus of claim 19, wherein the at least one processor is configured to determine the at least one of the indices by being configured to determine fixed values of index j based on fixed values of a scaling factor ($\alpha$) for path loss (PL) and a target received power ($P_o$).

25. A non-transitory computer-readable medium for wireless communication by a User Equipment (UE), the non-transitory computer-readable medium storing instructions which when processed by at least one processor performs a method comprising:
   deciding to report a reference Power Headroom (PH) for at least one carrier frequency in a transmission time interval (TTI);
   determining at least one of an index (j) of a target received power of a Physical Uplink Shared Channel (PUSCH) to be transmitted in the TTI and a path loss scaling factor, an index ($q_d$) of a reference signal used for measuring path loss for the carrier frequency, or an index (l) of a power control process used for the carrier frequency;
   calculating the reference PH based on one or more of the determined at least one index; and reporting, in the TTI, a Power Headroom Report (PHR) including the reference PH for the carrier frequency.

26. The non-transitory computer-readable medium of claim 25, wherein the determining comprises:
selecting the index l configured for the UE; and
selecting an active index j and an active index $q_d$ both associated with the selected index l.

27. The non-transitory computer-readable medium of claim 25, wherein the determining comprises:
selecting the indices l, j and, $q_d$ of the most recently scheduled PUSCH for the carrier frequency before detecting a trigger for reporting the PHR.

28. The non-transitory computer-readable medium of claim 25, wherein the determining comprises:
determining if an index of the TTI is part of a set of indices associated with a TTI pattern, wherein the UE is configured with at least one TTI pattern; and
selecting the index l configured for the determined TTI pattern; and
selecting an active index j and an active index $q_d$ both associated with the selected index l.

29. The non-transitory computer-readable medium of claim 25, wherein the determining comprises:
selecting the index l configured for the UE; and
selecting the index j associated with the selected index l; and
selecting the index $q_d$ as a function of an index of the TTI.

30. The non-transitory computer-readable medium of claim 25, wherein the determining comprises determining fixed values of index j based on fixed values of a scaling factor ($\alpha$) for path loss (PL) and a target received power ($P_o$).

* * * * *